United States Patent
Villaverde

(10) Patent No.: US 10,495,496 B2
(45) Date of Patent: Dec. 3, 2019

(54) HANDHELD DIGITAL MANOMETER

(71) Applicant: Hydro Flow Products, Inc., Lake Zurich (IL)

(72) Inventor: Marcial S. Villaverde, Mount Prospect, IL (US)

(73) Assignee: Hydro Flow Products, Inc., Lake Zurich, IL (US)

( * ) Notice: Subject to any disclaimer, the term of this patent is extended or adjusted under 35 U.S.C. 154(b) by 39 days.

(21) Appl. No.: 15/921,313

(22) Filed: Mar. 14, 2018

(65) Prior Publication Data

US 2019/0285442 A1 Sep. 19, 2019

(51) Int. Cl.
| | |
|---|---|
| *G01F 1/34* | (2006.01) |
| *G01F 1/36* | (2006.01) |
| *G01F 1/42* | (2006.01) |
| *F24F 11/00* | (2018.01) |
| *G01F 1/50* | (2006.01) |

(52) U.S. Cl.
CPC ............. *G01F 1/363* (2013.01); *G01F 1/42* (2013.01); *G01F 1/50* (2013.01)

(58) Field of Classification Search
CPC ..... G01F 1/34; G01F 1/36; G01F 1/42; G01F 1/50
See application file for complete search history.

(56) References Cited

U.S. PATENT DOCUMENTS

| | | | | |
|---|---|---|---|---|
| 5,329,818 | A * | 7/1994 | Frick | G01L 19/02 73/708 |
| 6,182,019 | B1* | 1/2001 | Wiklund | G01F 1/363 702/100 |
| 9,289,110 | B2* | 3/2016 | Woolford | A61B 1/00039 |
| 10,183,859 | B2* | 1/2019 | Kosberg | B81B 7/008 |
| 2005/0284235 | A1* | 12/2005 | Kielb | G01F 1/42 73/861.42 |
| 2012/0160011 | A1* | 6/2012 | Whittaker | E21B 43/24 73/30.03 |
| 2016/0133966 | A1* | 5/2016 | Komiya | H01M 8/04223 429/429 |
| 2016/0245541 | A1* | 8/2016 | Karamanos | G05D 7/0635 |
| 2017/0235398 | A1* | 8/2017 | Choi | G06F 3/0416 345/173 |

\* cited by examiner

*Primary Examiner* — Jewel V Dowtin
(74) *Attorney, Agent, or Firm* — Miller, Matthias & Hull LLP

(57) ABSTRACT

Systems and methods for measuring a flow rate through a nozzle include generating a first polynomial relationship between pressure and output voltage for a first pressure transducer located at one end of the nozzle and generating a second polynomial relationship between pressure and output voltage for a second pressure transducer located at another end of the nozzle. When a first voltage signal is received from the first pressure transducer and a second voltage signal from the second pressure transducer, the associated first and second pressures are generated based on the first and second polynomial relationships. A flow rate through the nozzle is then constructed based on the difference between the first pressure and the second pressure.

19 Claims, 4 Drawing Sheets

HANDHELD DIGITAL MANOMETER

TECHNICAL FIELD

The present disclosure is related generally to mobile electronic devices and, more particularly, to a handheld device for testing a flow rate of a conduit.

BACKGROUND

Current handheld manometers for testing flow rate via pressure differential through pitotless nozzles are inconvenient and require additional user steps off-device to arrive at a true GPM indication. Moreover, such devices are generally limited to a pressure resolution that is no greater than the resolution of the pressure transducers used in the device. For current devices, this results in a pressure resolution no better than about 5% of full scale, which is large enough to render current devices unsuitable for diagnosis of borderline cases.

Before proceeding to the remainder of this disclosure, it should be appreciated that the disclosure may address some of the shortcomings listed or implicit in this Background section. However, any such benefit is not a limitation on the scope of the disclosed principles, or of the attached claims, except to the extent expressly noted in the claims.

Additionally, the discussion of technology in this Background section is reflective of the inventors' own observations, considerations, and thoughts, and is in no way intended to be, to accurately catalog, or to comprehensively summarize any prior art reference or practice. As such, the inventors expressly disclaim this section as admitted or assumed prior art. Moreover, the identification or implication herein of one or more desirable courses of action reflects the inventors' own observations and ideas, and should not be assumed to indicate an art-recognized desirability.

BRIEF DESCRIPTION OF THE SEVERAL VIEWS OF THE DRAWINGS

While the appended claims set forth the features of the present techniques with particularity, these techniques, together with their objects and advantages, may be best understood from the following detailed description taken in conjunction with the accompanying drawings of which:

DETAILED DESCRIPTION

Figure 1:
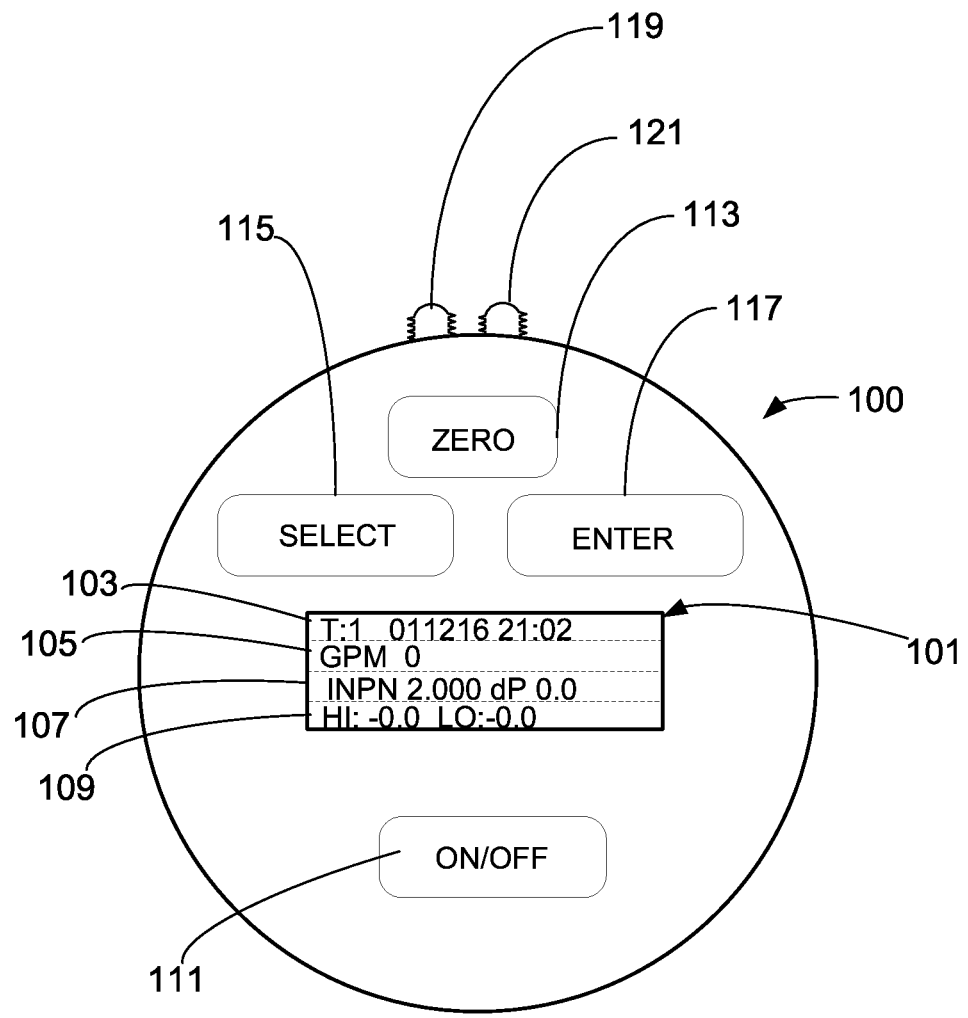
FIG. 1 is a simplified front view of a handheld flow meter in accordance with an example of the described principles.

Before presenting a detailed discussion of embodiments of the disclosed principles, an overview of certain embodiments is given to aid the reader in understanding the later discussion. As noted above, current handheld manometers for testing flow through conduits such as pitotless nozzles are inconvenient and require additional user steps off-device to arrive at a true GPM indication. Moreover, such devices are generally limited to a pressure resolution that is no greater than the resolution of the pressure transducers used in the device. For current devices, this results in a pressure resolution no better than about 5% of full scale. However, an error of this magnitude is enough to render current devices unsuitable for diagnosis of borderline cases, and is a hindrance in detecting and resolving problems that exhibit only a small variation in flow rate.

Turning now to the innovation of interest, in an embodiment of the described principles, a high precision, versatile, hand-held, battery operated manometer is provided that offers an easy to read display including high, low and differential pressure, as well as GPM. The device also feature a user friendly display including step-by-step instructions for selecting pitotless nozzle type, executing meter zeroing and operating functions. It will be appreciated that the disclosed principles apply to all flow elements that exhibit a rate-based pressure differential, whether a simple cylindrical conduit, or a more complex conduit.

The device provides simplified flow measurement from standpipes, hose cabinets, pressure reducing valves, fire pumps and fire hydrants without the need to manually determining an actual GPM value from off-device tables and materials. In an embodiment, pressures are measurable from 0 to 250 psi and from 0 to −14.7 psi (i.e., vacuum), with burst pressure being rated at three times maximum full scale pressure.

In a further embodiment, the device provides adjustable pressure reading damping, which allows the user to smooth the display measurement under common fluctuating pressure measurement conditions. In a further embodiment, the device is able to store and recall up to 256 prior readings. Further, the device provides a measurement hold and save configuration, and may turn itself off via auto-off if lying dormant for more than a predetermined period of time.

With this overview in mind, and turning now to a more detailed discussion in conjunction with the attached figures, the systems and techniques of the present disclosure are illustrated as being implemented in or via a suitable device environment. It will be appreciated that the described methods can be executed via alternative structures and that description is based on embodiments and examples within which or via which the disclosed principles may be implemented, and thus this description and the associated figures should not be taken as limiting the claims with regard to alternative embodiments that are not explicitly described herein.

Turning to FIG. 1, this figure is an external schematic illustration of a device in accordance with an example embodiment. The illustrated device 100 is in a generally circular shape, although any other shape may be used if desired. The face of the device 100 includes a number of fields and user interface elements. For example, a screen 101 is provided to convey information visually to the user, and may be divided into multiple fields 103, 105, 107, 109 to display types of information such as time, GPM, input pressure and differential pressure, and high pressure and low pressure.

The user-selectable elements include an on/off button 111 to power the device 100 on and off, a zero button 113 to zero the pressure display, a select button 115 to select a mode or option, and an enter button 117 to confirm a selection or option. The device 100 also includes two pressure inputs 119, 121 which the device references for the high and low pressures used to generate the flow rate for display.

It will be appreciated that a device with the described principles may differ in form and function other than in the respects set forth in the attached claims. Similarly, the internal components used to provide the claimed functionality may differ, but example schematics are given in FIG. 2 to aid those not of skill in the art.

Figure 2:
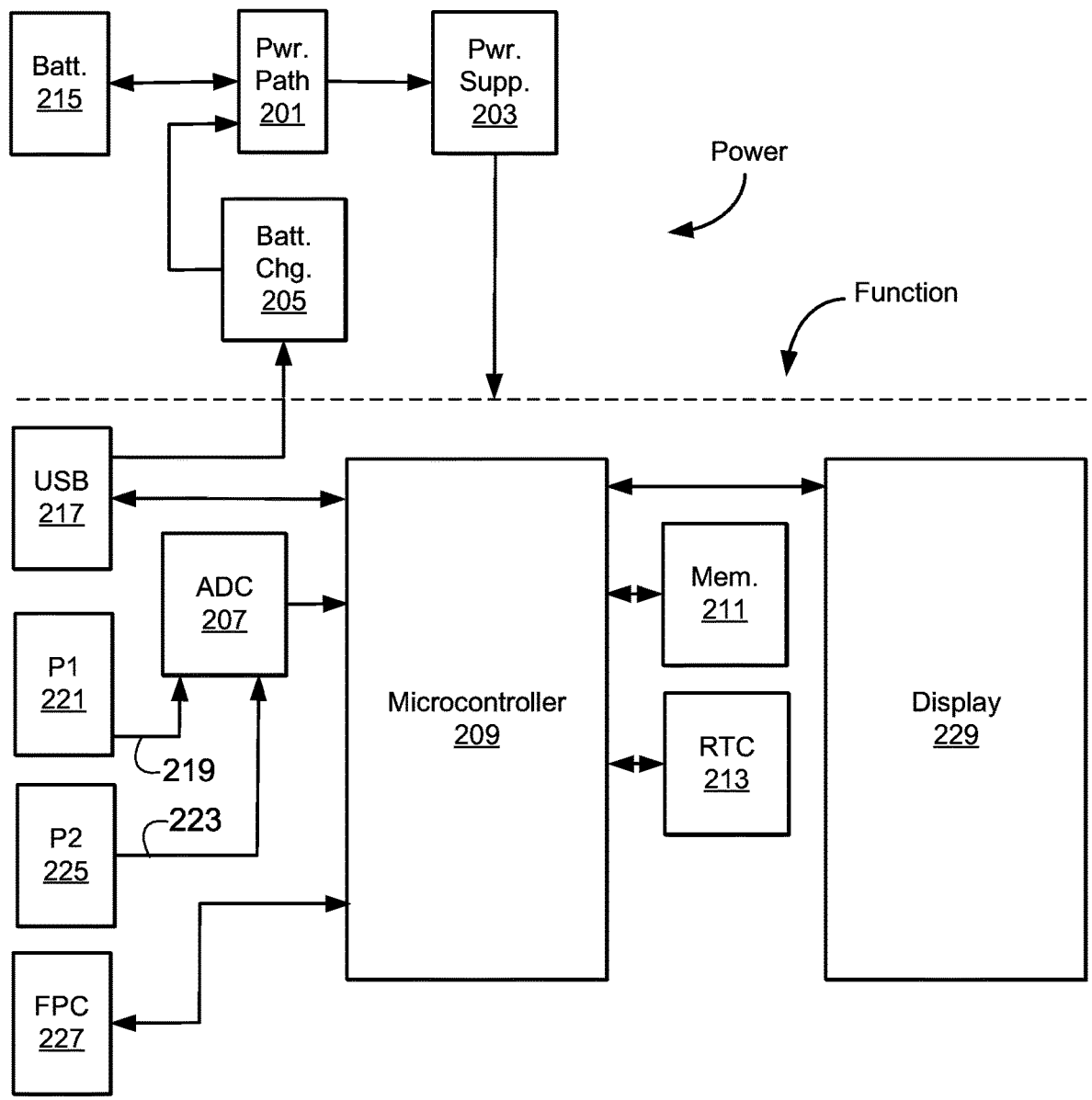
FIG. 2 is a simplified circuit schematic view showing an example circuit configuration in accordance with an embodiment of the described system.

Turning to FIG. 2, this figure is a schematic circuit diagram showing an implementation for providing the described functionality. As can be seen, the circuit 200 is made up of interconnected modules, namely power path 201, power supply 203, battery charger 205, ADC (analog-to-digital converter) 207, microcontroller 209, flash memory 211 and RTC 213. The RTC 213 is used to keep time for display purposes and to tag samples with a time and date.

In addition, the circuit 200 includes a battery input 215, a USB input 217, a first pressure signal 219 from a first pressure transducer 221, a second pressure signal 223 from a second pressure transducer 225 and a flexible printed circuit (FPC) input 227. Outputs of the circuit are displayed on a display 229, which may be an OLED ("Organic Light Emitting Diode") display or other type of display. The circuit optionally also provides audible output via an audio actuator or speaker, not shown. In the illustrated embodiment, the USB input 217 provides both data exchange to and from the device as well as providing power to the device via the battery charger 205.

In operation, the device 100 is connected to two fluid (or gas) sources at the two pressure inputs 119, 121 which then communicate the applied fluid pressure to the first pressure transducer 221 and the second pressure transducer 225. The first pressure transducer 221 and the second pressure transducer 225 produce corresponding analog pressure output signals 219, 223, which are converted to digital signals by the ADC 207.

It will be appreciated that the analog pressure output signals 219, 223 are very small, e.g., on the order of 100 mV at full scale. For this reason, the ADC 207 may first amplify the signals prior to converting them to digital pressure signals.

The microcontroller 209 receives the resultant digital pressure signals and converts them to corrected pressure signals by applying a third order calibration transform that is unique to each transducer. As will be explained in greater detail below, the third order calibration transform linearizes the output of the transducers, taking into account the slight nonlinearity of each transducer. The corrected pressure signals are output to the display 229 and are also used to calculate a flow rate, e.g., in GPM.

In particular, with a nozzle of known characteristics, a given pressure differential results in a known flow rate. Typically, a user must refer to tabulations of such characteristics and their interrelationships, but in an embodiment, the microcontroller references such data internally, e.g., in memory 211 or processor memory (not shown) and outputs a GPM value to the display.

Figure 3:
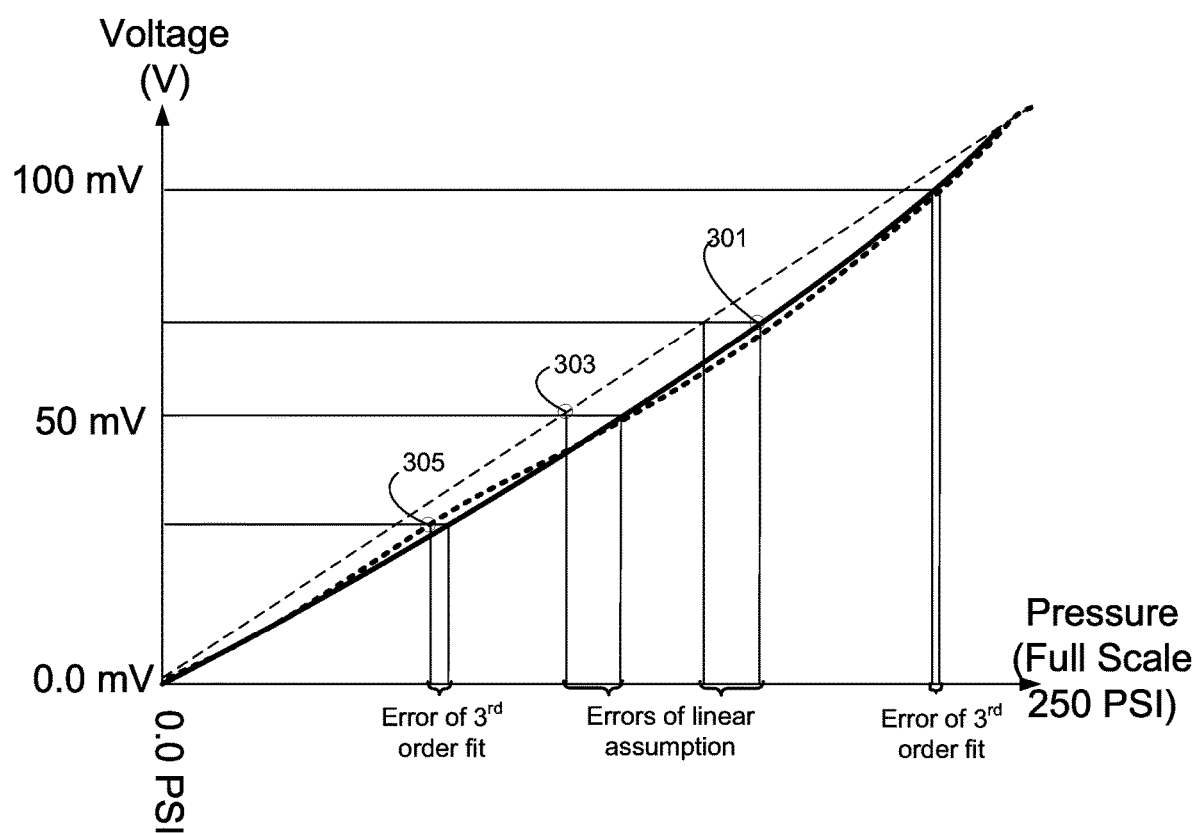
FIG. 3 is a simulated data plot showing linear and $3^{rd}$ order curve fitting in in accordance with an embodiment of the disclosed principles.

Turning to a more in-depth discussion of transducer nonlinearity, FIG. 3 shows a typical transducer curve 301 of pressure versus voltage. That is, for a given pressure on the horizontal axis, a certain voltage output is produced as reflected on the y-axis. If one were to treat the transducer as linear, and assume a linear response as shown by line 303, then the resultant output voltage for a given input pressure may be slightly inaccurate, and indeed, resolution is typically up to 5% of full scale. This limits the resolution of the device.

However, in an embodiment of the disclosed principles, each transducer is calibrated at the device level (each actual device) or at the class level (each part class). This is done by applying third order polynomial curve fitting to the output 301 of the sensor element in the transducer. In this way, the resolution of a 5% error transducer may be reduced by a factor of 100, i.e., to as low as 0.05% of full scale. Thus for example, the traditional 5% error of a 100 mV transducer results in a best resolution of about 5 mV, while the 0.05% error of the described system results in a best resolution of about 50 μV, i.e., two orders of magnitude better. The errors between the linear assumption and the actual sensor output are shown in FIG. 3, as are the errors between the $3^{rd}$ order curve and the actual sensor output. As can be seen, even in this simplified example, the errors from the $3^{rd}$ order fit are much smaller than those caused by the linear model.

Those of skill in the art will understand the way in which polynomial curve fitting is executed, but for others, it should be noted that this process entails deriving a third order polynomial $(Ax+Bx^2+Cx^3)$ that best fits the observed voltage data. The linear assumption could be viewed as a first order polynomial fit, but it is only a fit for perfectly linear data. In the foregoing equation, the parameters A, B and C are constants for a given device or class. Thus, for a device whose sensor output is very nearly a straight line, the values of B and C will be very small. Similarly, for a device whose sensor output is nearly parabolic, the values of A and C will be very small. However, for a typical nonlinear response, A, B and C will be nonzero.

It should be appreciated that the fit of the third order polynomial to the sensor output will be much closer than the fit of the straight line that is normally assumed. Moreover, the fit of the third order polynomial need only be optimized over the operating range of the sensor. Thus, if the sensor has a designated full scale range of 100 millivolts (mV), then it is not important what the fit may be between the response and the polynomial at 120 mV.

Figure 4:
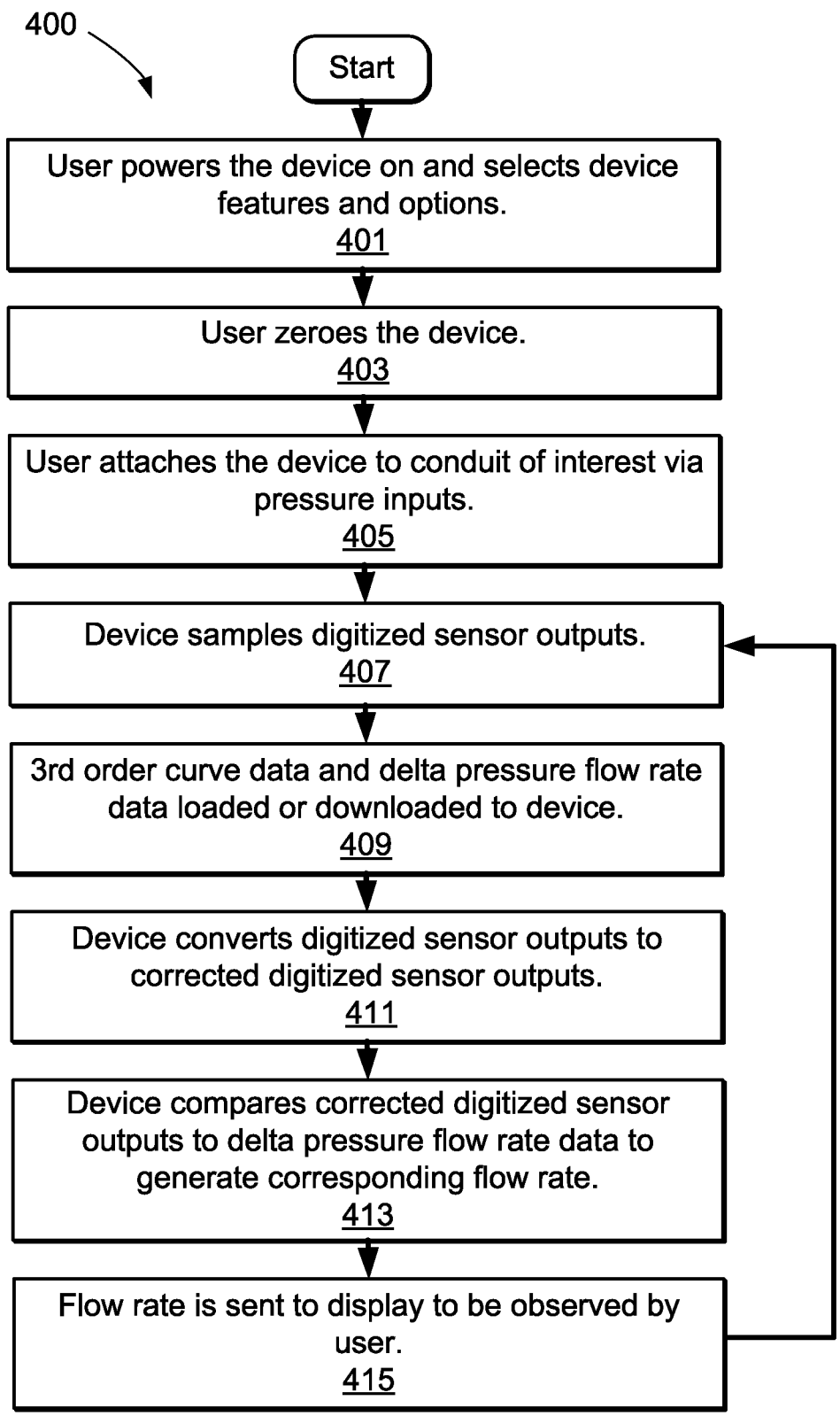
FIG. 4 is a flow chart showing a process in accordance with a further example of the described principles.

We turn to FIG. 4, which is a flow chart of a use process for the device 100 in accordance with an embodiment of the disclosed principles. Sensor calibration via $3^{rd}$ order curve fitting is assumed to have taken place prior to process 400, although in an embodiment, no $3^{rd}$ order curve fit is performed and a linear response is assumed. At stage 401, the user powers the device 100 on and selects from among various device features and options using the user interface elements shown in FIG. 1. The user may zero the device at stage 403, e.g., by using the zero input element 113.

At stage 405 of the process 400, the device user attaches the device 100 to a conduit of interest via the pressure inputs 119, 121 of the device 100. The pressure inputs 119, 121 are connected on either side of a mapped flow element, i.e., one for which the rate vs. flow characteristics are known. The device samples the digitized sensor outputs at stage 407, and then at stage 409, $3^{rd}$ order curve data and delta pressure flow rate data may be downloaded to the device, e.g., via the USB input 217 or the FPC input 227 (FIG. 2).

At stage 411 the digitized sensor outputs are converted to corrected digitized sensor outputs (e.g., via $3^{rd}$ order fitting), which are then compared to the delta pressure flow rate data at stage 413 to generate a corresponding flow rate. At stage 415, the flow rate is sent to the display to be observed by the user.

As noted above, the dwell time and smoothing of the rate display may be controlled to provide stable viewing. For example, multiple samples may be averaged at stage 407 prior to moving to stage 409, or multiple corrected digitized sensor outputs may be averaged at stage 411 before proceeding to stage 413. Indeed, in an embodiment, multiple flow rates are generated and averaged at stage 413 before proceeding to stage 415 to display the result. In addition, readings may be held, e.g., by pressing the select button 115, and may be stored in memory as well. In an embodiment, the device 100 also displays a graph over time of rate readings if desired.

With respect to the microcontroller 209, this device may be any of a microprocessor, microcomputer, application-specific integrated circuit, and the like. For example, the microcontroller 209 can be implemented by one or more microprocessors or controllers from any desired family or manufacturer. Similarly, the associated 211 and any memory internal to the microcontroller 209 are nontransitory media that may reside on the same integrated circuit as the microcontroller 209. Additionally or alternatively, the memory may be accessed via a network, e.g., via cloud-based storage. The memory may include a random access memory (i.e., Synchronous Dynamic Random Access Memory (SDRAM), Dynamic Random Access Memory (DRAM), RAMBUS Dynamic Random Access Memory (RDRM) or any other type of random access memory device or system). Additionally or alternatively, the memory may include a read-only memory (i.e., a hard drive, flash memory or any other desired type of memory device).

It will be appreciated that the process steps executed by the microcontroller 209 are executed via the computerized execution of computer-readable instructions from memory. Thus, for example, the microcontroller 209 is configured through memory to receive user selections via input buttons or data connections, display any associated information to the user, download and apply $3^{rd}$ order curve data and delta pressure flow rate data, sample the digitized sensor outputs, convert the digitized sensor outputs to corrected digitized sensor outputs, compare the corrected digitized sensor outputs to the delta pressure flow rate data and generate and display the corresponding flow rate.

It will be appreciated that various systems and processes have been disclosed herein. However, in view of the many possible embodiments to which the principles of the present disclosure may be applied, it should be recognized that the embodiments described herein with respect to the drawing figures are meant to be illustrative only and should not be taken as limiting the scope of the claims. Therefore, the techniques as described herein contemplate all such embodiments as may come within the scope of the following claims and equivalents thereof.

I claim:

1. A flow meter for determining a flow rate of a liquid or gas through a known flow element, the flow meter comprising:
   a first pressure inlet and a first pressure transducer associated with the first pressure inlet, the first pressure transducer producing a first pressure signal reflective of a pressure at the first pressure inlet;
   a second pressure inlet and a second pressure transducer associated with the second pressure inlet, the second pressure transducer producing a second pressure signal reflective of a pressure at the second pressure inlet; and
   a microcontroller linked to the first pressure transducer and the second pressure transducer to receive the first pressure signal and the second pressure signal, the microcontroller being configured to convert the first pressure signal and the second pressure signal to a corrected first pressure signal and a corrected second pressure signal via a first 3rd order polynomial associated with the first pressure transducer and second 3rd order polynomial associated with the second pressure transducer and to generate a flow rate by calculating a difference between the corrected first pressure signal and corrected second pressure signal and associating the difference to a flow rate via a predetermined tabulation of pressure differentials and resultant flow rates.

2. The flow meter in accordance with claim 1, further comprising a display, wherein the microcontroller is further configured to cause the generated flow rate to be shown on the display.

3. The flow meter in accordance with claim 1, wherein the meter is hand-held.

4. The flow meter in accordance with claim 1, further comprising a USB (universal serial bus) port.

5. The flow meter in accordance with claim 1, further comprising an FPC (flexible printed circuit) port.

6. The flow meter in accordance with claim 5, wherein one or more of the first 3rd order polynomial, second 3rd order polynomial and predetermined tabulation are received by the meter via the USB port.

7. The flow meter in accordance with claim 1, wherein the microcontroller is further configured to store a plurality of generated flow rates in memory for selective recall.

8. The flow meter in accordance with claim 1, further comprising an ADC (analog to digital converter), wherein the first pressure signal and the second pressure signal are analog signals that are converted to digital representation by the ADC prior to receipt by the microcontroller.

9. A method for determining a flow rate of a liquid or gas through a known flow element, the method comprising:
   receiving a first pressure signal from a first pressure transducer associated with a first pressure inlet connected to a first end of the flow element;
   receiving a second pressure signal from a second pressure transducer associated with a second pressure inlet connected to a second end of the flow element;
   converting the first pressure signal and the second pressure signal to a corrected first pressure signal and a corrected second pressure signal via a first 3rd order polynomial associated with the first pressure transducer and second 3rd order polynomial associated with the second pressure transducer;
   generating a flow rate by calculating a difference between the corrected first pressure signal and corrected second pressure signal and associating the difference to a flow rate via a predetermined tabulation of pressure differentials and resultant flow rates.

10. The method in accordance with claim 9, further comprising displaying the generated flow rate on a visual display.

11. The method in accordance with claim 9, further comprising receiving one or more of the first 3rd order polynomial, the second 3rd order polynomial and the predetermined tabulation from an external source.

12. The method in accordance with claim 11, wherein receiving from the external source comprises receiving via a USB (universal serial bus) port.

13. The method in accordance with claim 11, wherein receiving from the external source comprises receiving via an FPC (flexible printed circuit) port.

14. The method in accordance with claim 9, further comprising storing the generated flow rate in a computer-readable memory.

15. The method in accordance with claim 14, further comprising recalling the generated flow rate from the computer-readable memory.

16. The method in accordance with claim 9, wherein the first pressure signal and the second pressure signal are analog signals, further comprising converting the first pressure signal and the second pressure signal to digital representations prior to converting the first pressure signal and the second pressure signal to corrected first and second pressure signals.

17. A method for determining a rate of flow of a fluid through a nozzle, the method comprising:
    characterizing a first pressure transducer located at one end of the nozzle to generate a first polynomial relationship between pressure and output voltage for the first sensor;
    characterizing a second pressure transducer located at another end of the nozzle to generate a second polynomial relationship between pressure and output voltage for the second sensor;
    receiving a first voltage signal from the first pressure transducer and a second voltage signal from the second pressure transducer;
    generating a first pressure from the first voltage signal based on the first polynomial relationship;
    generating a second pressure from the second voltage signal based on the second polynomial relationship; and
    generating flow rate through the nozzle based on a difference between the first pressure and the second pressure.

18. The method in accordance with claim 17, further comprising storing the generated flow rate in a computer-readable memory.

19. The method in accordance with claim 18, further comprising recalling the generated flow rate from the computer-readable memory.

* * * * *